United States Patent [19]

Whitcomb et al.

[11] 4,452,287
[45] Jun. 5, 1984

[54] FELLER ASSEMBLY FOR TREE HARVESTING APPARATUS

[75] Inventors: Paul H. Whitcomb, Woodstock, Canada; Thomas G. Bakowski, West Seneca, N.Y.

[73] Assignee: Eaton Corporation, Cleveland, Ohio

[21] Appl. No.: 399,628

[22] Filed: Jul. 19, 1982

[51] Int. Cl.³ .......................................... A01G 23/08
[52] U.S. Cl. .................... 144/34 E; 144/339
[58] Field of Search ................. 144/34 R, 34 E, 3 D, 144/2 Z, 339

[56] References Cited

U.S. PATENT DOCUMENTS

| | | | |
|---|---|---|---|
| 3,826,295 | 7/1974 | Johnson et al. | 144/34 E |
| 3,896,862 | 7/1975 | Windsor | 144/3 D |
| 3,920,057 | 11/1975 | Hamilton et al. | 144/34 E |
| 3,995,671 | 12/1976 | Wixt | 144/34 E |
| 4,022,259 | 5/1977 | Sturtz, Jr. | 144/34 E |
| 4,077,446 | 3/1978 | Redman et al. | 144/34 E |
| 4,077,447 | 3/1978 | Thompson et al. | 144/34 E |

FOREIGN PATENT DOCUMENTS 2301103 7/1973 Fed. Rep. of Germany .... 144/34 E

Primary Examiner—W. D. Bray
Attorney, Agent, or Firm—C. H. Grace; C. J. Toddy

[57] ABSTRACT

A tree feller assembly for use with a tree harvesting apparatus including a support structure defining a common pivot axis with a pair of shear arm means carrying cutter blade means disposed for pivotal movement about the common pivot axis. First power actuator means connects the shear arm means together and is disposed below and forwardly of the common pivot axis for moving the cutter blade means toward and away from one another upon actuation thereof. A pair of clamp members is pivotally mounted on the support structure above the shear arm means with a second power actuator means connecting the clamp members together. The clamp members are disposed forwardly of and generally parallel to the first power actuator means for moving the clamp members toward and away from one another. A wear plate means is mounted on the support structure and is disposed between the shear arm means to provide a guide for and self-aligning action on the cutter blade means upon actuation of the first power actuator means.

11 Claims, 6 Drawing Figures

FELLER ASSEMBLY FOR TREE HARVESTING APPARATUS

Technical Field

The present invention relates to tree harvesting apparatus and more particularly to a new improved feller head assembly of the type which may be detachably mounted on the end of an articulated felling boom for severing trees for straight and/or angular cutting modes.

Background Art

In tree harvesting, it is important to cut and retain as much of the tree as possible because of the ever increasing shortage of trees especially by reason of the current demand for their use as an energy source. Accordingly, it is of primary importance that the tree trunk be cut as low as possible to the ground in order to reclaim as much of the wood product as possible. Such tree harvesting is often conducted in forested areas under conditions which are not readily handled by the harvesting machines and particularly the tree feller head assembly which must be positioned so as to cut the tree trunk as close to the ground as possible for maximum wood product recovery. Specifically, in many forested areas, the tree stand and/or the undergrowth is dense, the terrain is rough or the trees may be leaning, all of which require good performance and versatility characteristics for the feller head assembly.

Heretofore, tree harvesting vehicles have generally included a felling head which is operable to clamp and sever the tree trunk adjacent the ground. The clamped and severed tree trunk is then moved to a delimbing assembly which removes the branches and cuts off the top of the tree trunk. The delimbed and topped tree trunk is then deposited in a skidder or bunk. Such type of tree harvesting vehicle is disclosed in the present assignees U.S. Pat. No. 3,896,862. This type of machine is commercially available on the market under the trademark TIMBERJACK.

In recent years a number of various feller head designs have been developed to gather and cut a tree trunk adjacent its base, as aforesaid. In general, these prior designs having not been completely satisfactory in providing optimum tree cutting performance together with good versatility characteristics for operating under adverse forestry conditions and at a minimum cost. Accordingly, it will be recognized that such feller head assembly should be capable of not only effectively cutting the tree through proper application of torque forces for given tree trunk size, but the assembly should also be of a compact design having a relatively low profile so as to be capable of handling various types of adverse tree harvesting conditions.

Disclosure of the Invention

It is accordingly an object of the present invention to provide a new and improved feller head assembly adapted for detachable connection to an articulated boom of a tree harvesting machine which assembly is of a simple yet rugged design and which provides optimum lever advantage for providing high torque shear forces over the range of the predetermined cutting width such as up to at least 20 inches.

It is an additional object of the present invention to provide such a feller head assembly with the opposed shear arms being mounted for pivotal movement about a common horizontal pivot axis so as to impart a generally vertically arched shearing action thereby to minimize butt splittage.

A further object of the present invention is to provide such a feller assembly which obviates the need for complex linkage mechanisms and yet which minimizes load forces on the mounting bearings, pivot pin assembly and reduces other structural stresses on the shear arms and cutting blade elements.

A still further object of the invention is to provide such a tree feller head assembly which incorporates a minimum cutting radius (i.e. linear distance from pivot axis to cutting edge) for optimum lever advantage, and wherein the cutting radius can be effectively maintained for cutting trees disposed at an angle.

A yet further object of the invention is to provide a tree feller head assembly which incorporates a power actuator and shear cutter arm construction which enables lateral displacement of the power actuator in a direction toward the shear arms as they are closed in cutting relation toward one another so as to maximize the cutting forces at the threshold of the cutting action.

Still another object of the present invention provide a tree feller head assembly which incorporates a novel clamp member construction which is disposed above and directly adjacent and forward of the common pivot shear arm axis so as to provide with the shear arm construction a compact, low profile structure which can be readily used with various tree harvester configurations.

Broadly stated, the present invention includes such feller head assembly for use with a tree harvesting apparatus which assembly comprises a feller head having a support structure. Pivot pin means defining a common horizontal pivot axis is disposed adjacent one end of the support structure, and a pair of oppositely disposed and laterally spaced shear arm means are mounted for pivotal movement on the common pivot axis and include cutter blade means adapted for pivotal movement toward and away from one another adjacent the opposite end of the support structure upon actuation of a power actuator. The power actuator is pivotally attached at its opposed ends to and extends generally horizontally between the shear arm means and transversely relative to the common pivot axis. The power actuator is disposed forwardly of and below the common pivot axis and is attached to the shear arms so as to be bi-axially oriented thereby to provide a vertically arched shearing action on the tree to be sheared. The assembly includes a pair of oppositly disposed clamp members which are pivotally mounted on the support structure for movement toward and away from one another. The clamp members are disposed above the shear arm means and generally forwardly of the common pivot axis to provide a compact, low profile structure.

Best Mode for Carrying Out the Invention

Figure 1:
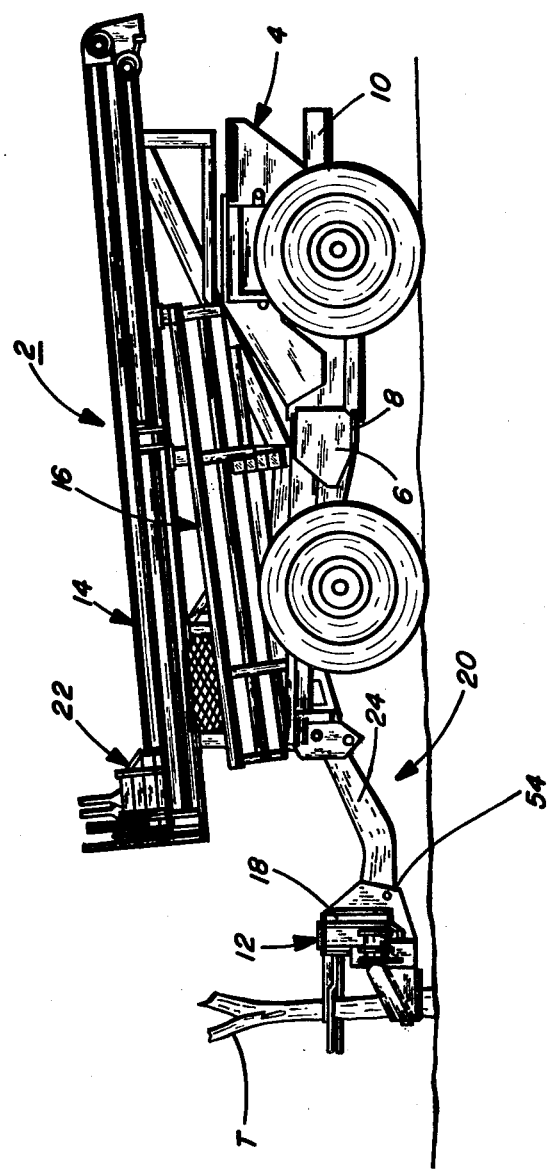
FIG. 1 is a side elevation view of a tree harvesting apparatus incorporating the tree felling head assembly of the present invention.

Referring now again to the drawings and particularly to FIG. 1 thereof, there is illustrated a tree harvesting apparatus, designated generally at 2, incorporating the present invention. The apparatus may include an articulated vehicle having a front section 6 which is pivotally connected, as at 8, to a rear section 10. In this embodiment, the vehicle 2 provides a base or platform upon which the felling assembly of the invention, designated generally at 12, is mounted which includes a delimber assembly 14 and a carrier or bunk 16 mounted for cooperative tree harvesting operations.

In general, the felling assembly 12 includes a felling head which is operable to grip the trunk of a standing tree T, as illustrated in FIG. 1. The clamped tree is severed adjacent the trunk by operating the felling head. Once the tree trunk is severed, an articulated felling boom assembly, designated generally at 20, is operated to position the severed tree trunk into the delimber assembly 14. A delimber carriage 22 is then moved axially outwardly along the longitudinal extending delimbing boom to effectively cut or strip the limbs from the trunk of the tree. The delimbed tree trunk is then deposited in the bunk 16, all of the operations of which are more fully described in the aforementioned U.S. Pat. No. 3,896,862.

As disclosed in the aforementioned U.S. Pat. No. 3,896,862, to provide for efficient operation of the tree harvesting apparatus 2, it is preferable for the felling head 18 to be movable to engage a standing tree in any one of a plurality of positions or orientations relative to the front end 6 of the vehicle. Accordingly, the outer boom section of the felling boom assembly 20 may be movable about any of three axes to provide for sideways, tilting or up and down movement of the felling head 18. Accordingly, due to the three modes of movement of the outer boom section 24, the felling head 18 can be readily positioned by the operator relative to the trunk of a tree. It will be recognized, therefore, that the felling head 18 can be simultaneously moved relative to all three axes to provide an efficient tree harvesting system.

Figure 2:
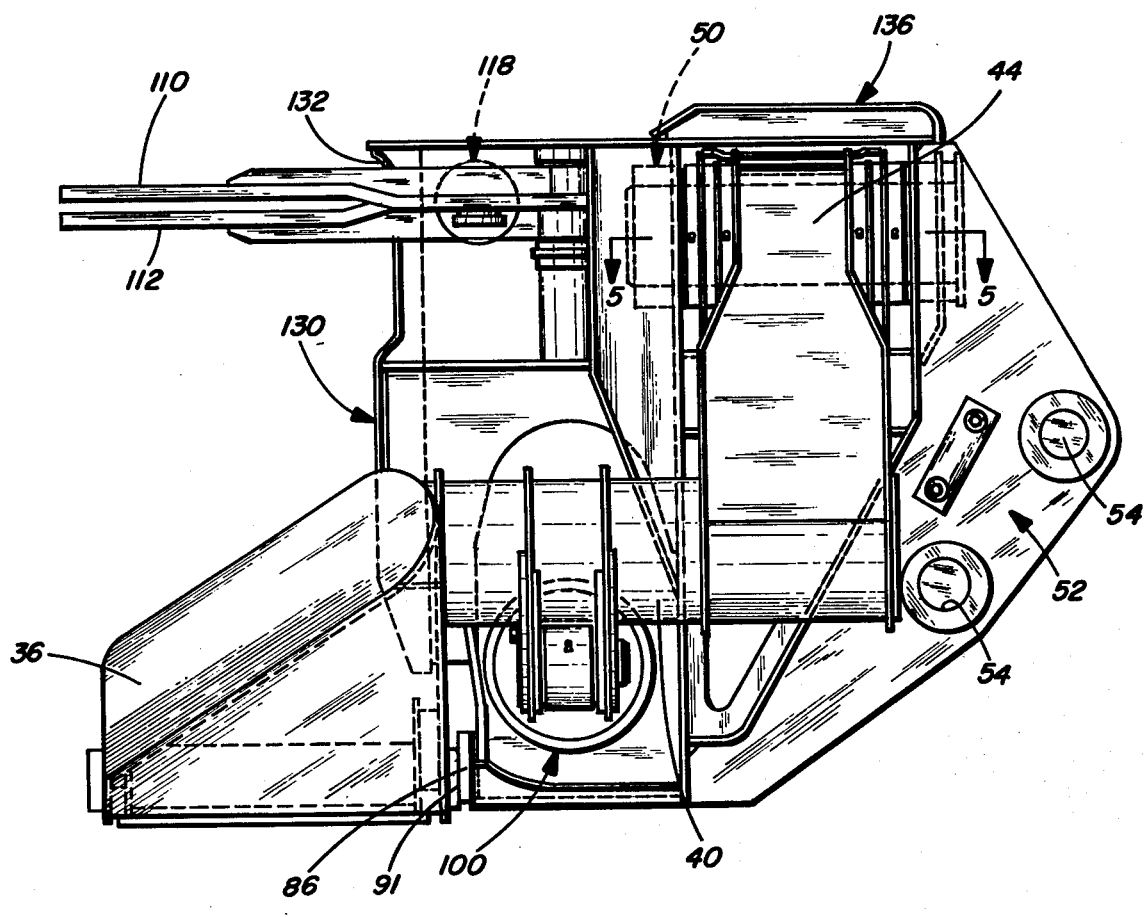
FIG. 2 is a side elevation view, on an enlarged scale, of the tree felling assembly removed from FIG. 1 for purposes of clarity.
Figure 3:
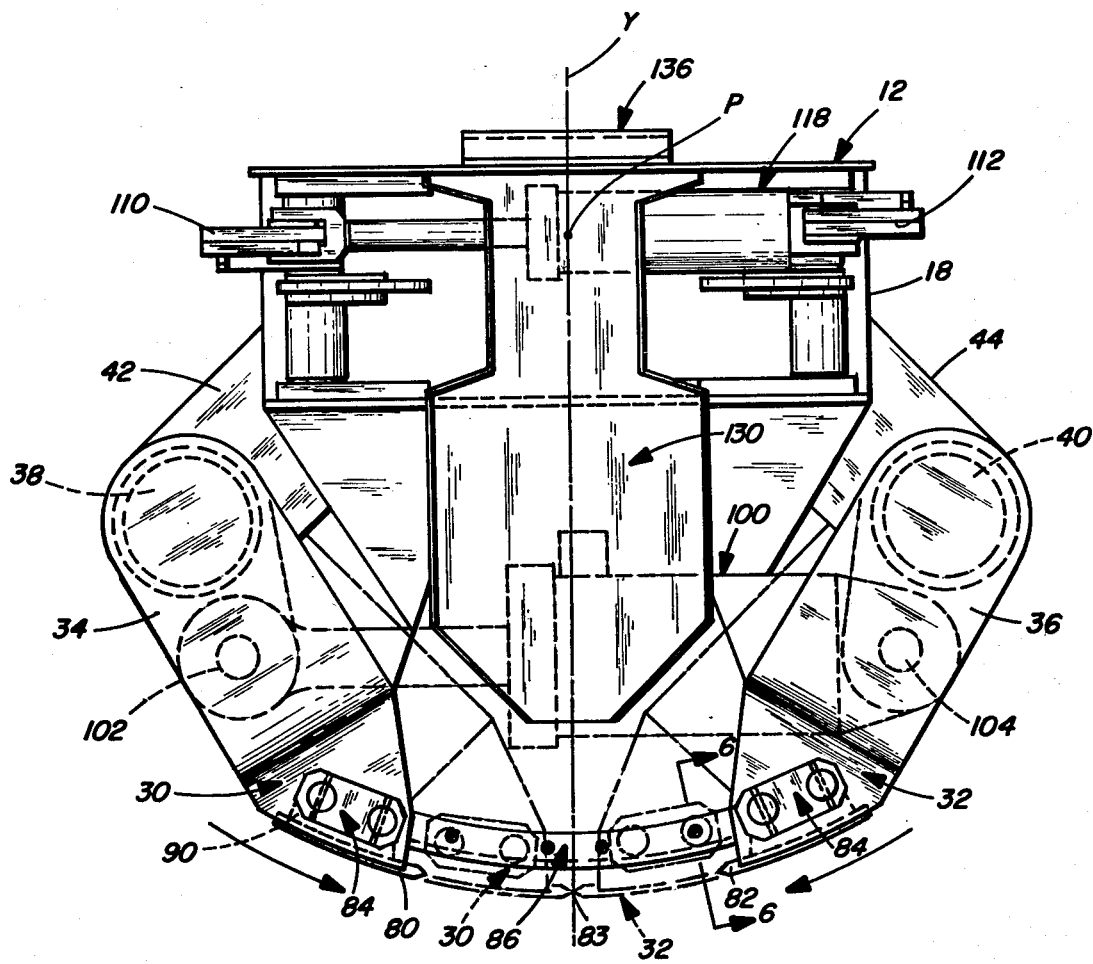
FIG. 3 is a front elevation view, on an enlarged scale, of the tree felling assembly of the invention removed from FIG. 1 for purposes of clarity.
Figure 4:
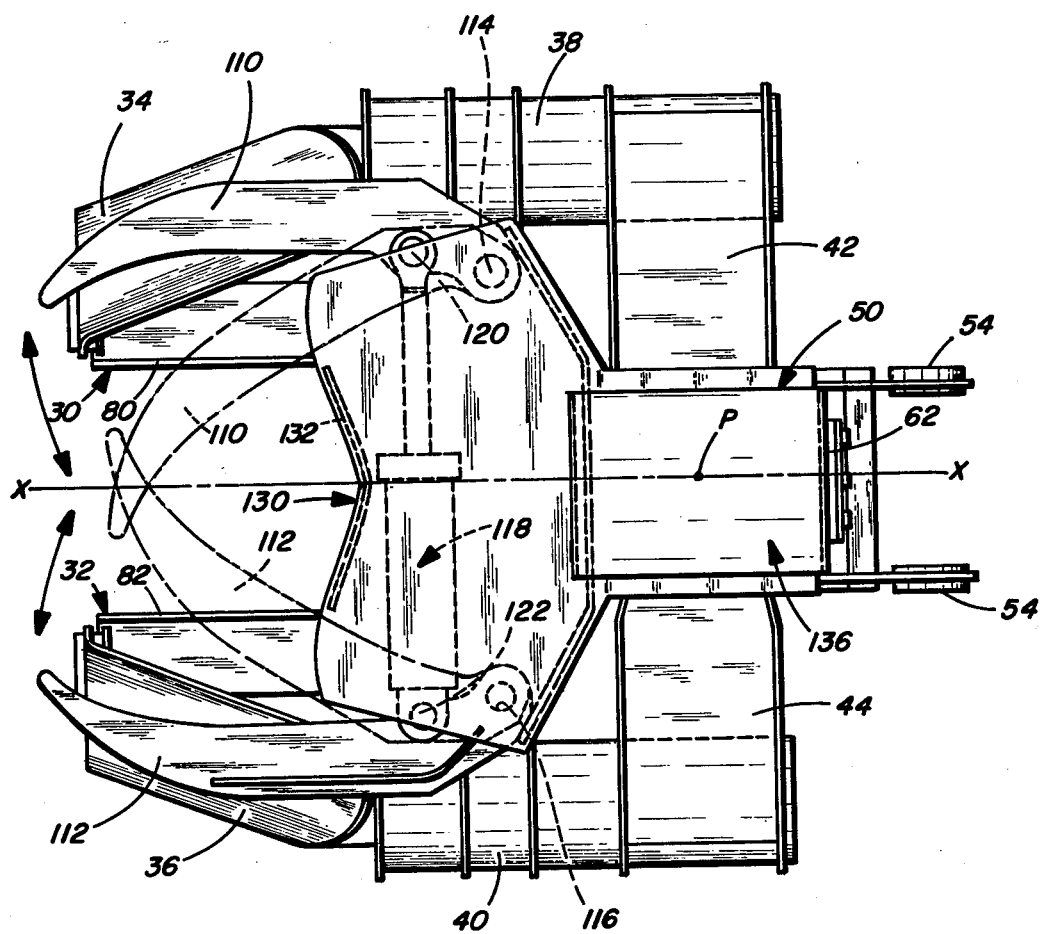
FIG. 4 is a top plan view, on an enlarged scale, of the tree feller assembly removed from FIG. 1 for purposes of clarity.

Now in accordance with the invention and with reference to FIGS. 2, 3 and 4 of the drawings, the tree feller assembly includes the feller head 18 which includes a pair of oppositely disposed and laterally spaced shear arms 30 and 32 defining a generally clam-shell construction. In accordance with an important aspect of the invention, the shear arms 30 and 32 are mounted for pivotal movement toward and away from one another about a common horizontal axis designated by the dotted line X in FIG. 4. Accordingly, the shear arms 30 and 32 pivot about the horizontal axis X for swinging movement toward and away from one another in a general plane which extends generally parallel to the three to be cut.

In the embodiment illustrated, the shear arms 30 and 32 are integrally attached via angle plates 34 and 36 to elongated tubular members 38 and 40 which extend parallel to one another and to the pivot axis X and hence, generally transverse to the tree to be cut. The tubular members 38 and 40 each mount integral link members 42 and 44 which together define a generally L-shaped configuration in front elevation. The link members extend angularly upwardly and inwardly (FIG. 3) for pivotal mounting on a pivot pin assembly, designated generally at 50, which is mounted to a frame structure 52. The frame structure may be pivotably connected by a suitable fastener such as a pin (not shown) via bolt holes 54 to the boom section 24. The felling head 18 may then be pivoted about the axis defined by the pin holes 54 by a suitable hydraulic cylinder (not shown) for pivoting the head relative to the boom section 24. Accordingly, by this arrangement the shear arms 30 and 32 are integrally and rigidly mounted via the tubular members 38 and 40 to the pivot assembly 50 via the link members 42 and 44 thereby to effectively minimize lateral load forces on the pivot assembly 50.

Figure 5:
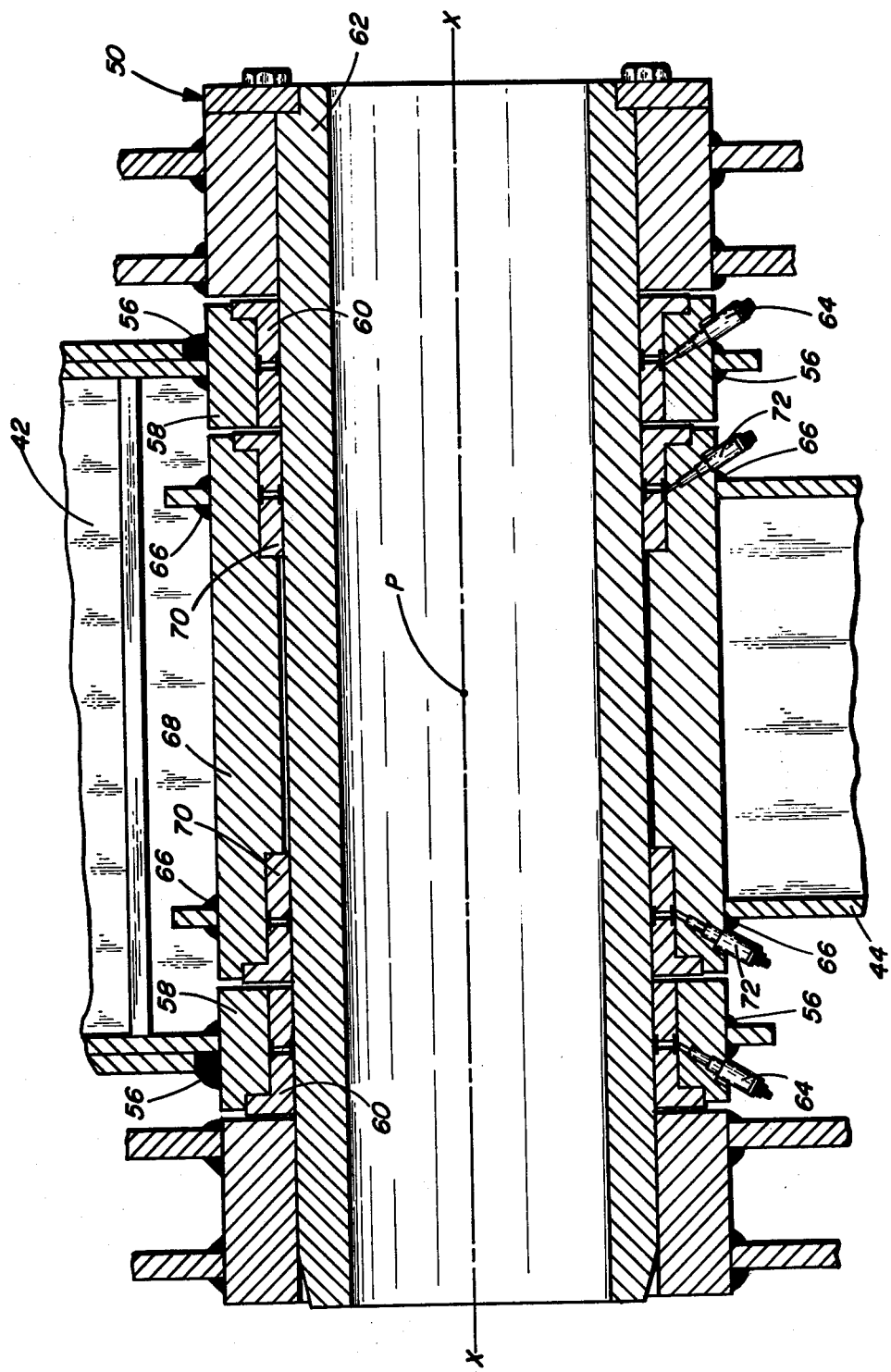
FIG. 5 is a fragmentary, horizontal section view, on an enlarged scale, taken along the line 5—5 of FIG. 2.

Now in the invention and with reference to FIG. 5, the link member 42 is of a greater transverse dimension relative to the link member 44 and is fixedly attached via weldments, as at 56, to oppositely disposed, annular journal ring members 58. The bearing rings 60 are press-fit into the journal ring members 58 and slidably ride on the elongated cylindrical pivot pin member 62. Suitable grease fittings, as at 64, may be provided to lubricate the confronting surfaces between the pin and the bearing members. The other link member 44 is of a reduced transverse dimension compared to the link member 42 so that the link members can pivot about the horizontal axis X without interference with respect to one another. Here, the link member 44 is fixedly attached by weldments, as at 66, to an annular journal ring 68. Bearing rings 70 are press-fit into the journal ring 68 and slidably ride on the pin member 62. Here again, suitable grease fittings, as at 72, may be provided for lubricating the bearing surfaces between the component parts. Accordingly, by this arrangement the shear arms 30 and 32 can be effectively pivoted via the bearing and journal arrangement about a common horizontal axis X defined by the pin member 62.

In the invention, the shear arms 30 and 32 each detachably mount arcuate (in side elevation) cutter blade elements 80 and 82 which preferably have cutting edges as at 81, disposed at an angle of approximately 45°. As shown in FIG. 3, the blade elements 80 and 82 are adapted to pivot toward and away from one another, as illustrated by the arrows, so as to abutt in the closed position at a point, as at 83, disposed along the central vertical axis Y. In the form shown, the cutter blade elements may be fixedly attached by a bracket assembly designated generally at 84, by means of upstanding plates 90 made integral with the respective blade elements.

Figure 6:
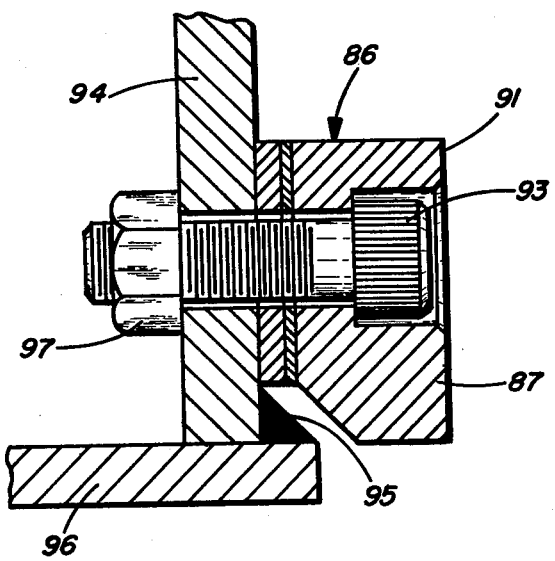
FIG. 6 is a fragmentary, generally vertical section view, on an enlarged scale, taken along the line 6—6 of FIG. 3.

As best seen in FIGS. 2, 3 and 6, an arcuate wear plate 86 is fixedly attached to the frame structure 52 and spans the distance between the shear arms 30 and 32 in the open position of the blade elements. The plate 86 may be detachably connected via bolts 93 to bracket plates 94 and 96 which are welded together, as at 95, and attached to the frame structure 52. The plate may simply be replaced by removal of the nuts 97 after damage or extensive wear, as desired. The plate 86 includes a relatively heavy (widthwise) body 87 which provides a guide and wear surface, as at 91, upon sliding contact with the interior abutting surfaces (FIG. 2) of the shear arms so as to provide a guide and self-align action on the shear arms. Also, the plate provides a stop for abutment with the tree trunk and acts to reduce shear and stress forces transmitted to the shear arms.

Now in the invention, to pivot the shear arms 30 and 32 from the solid open position illustrated in FIG. 3 toward the closed position (broken line) for cutting a tree trunk by a shearing action, a power actuator 100 is mounted to extend horizontally between the shear arms. Preferably, the actuator is a double acting piston and cylinder type hydraulic actuator. The actuator 100 may be remotely controlled to extend the same so as to move the shear arms outwardly and then contracted to move the shear arms and hence, the cutter blade elements 80 and 82 toward one another. Accordingly, in the embodiment illustrated the actuator 100 is pivotally mounted, as at 102, at one end to one shear arm 30 and is pivotally mounted, as at 104, at the opposite end to the other shear arm 32 thereby to enable the arms to be pivoted toward and away from each other about the common pivot axis X. As a result of the pivotal movement of the two shear arms about the common horizontal axis X, there is provided a vertically arched shearing action. That is, this action divides the radial shear force into a horizontal shear force and a vertical downward shear force (away from the tree butt component) which minimizes butt splitage. Accordingly, by this arrangement the shearing arch radius (distance from the pivot point to the cutter blade elements) is kept to an optimum value which is determined by the size of the vertical shear force component. In this embodiment, this value is represented (FIG. 3) by the distance between the point P and the cutting edge 83 taken along the vertical axis Y.

As will be seen, the power actuator 100 extends horizontally between the shear arms 30 and 32 and is disposed axially (relative to pivot axis X) forwardly of the pin assembly 50, as best seen in FIG. 4. Further, the actuator is disposed so as to extend horizontally below not only the pivot axis X but also below the connections of the link arms 34 and 36 to the tubular support members 38 and 40 which act to hold the actuator and hence, the shear arms 30 and 32 axially forwardly of the pivot assembly 50. By this arrangement, the actuator acts to drop or be displaced, in vertical direction (FIG. 3), as the shear arms 30 and 32 close. This action provides a greater cutting force and at a time (threshold) when such force is required most. Also, this disposition of the actuator reduces the net forces on the pivot assembly 50 since the reaction forces of the blade elements 80 and 82 and the actuator tend to balance or cancel each other out.

In the invention, the construction and orientation of the pivot point, cutter blade elements and power actuator provides new and improved results. It will be seen that these components are oriented bi-axially in vertical and horizontal axes. That is, the pivot axis X is disposed above and at right angles to the horizontal axis of the power actuator 100 with the actuator extending horizontally disposed between the shear arms 30, 32 and below the integral connection between the tubular support members 34 and 36 and the link members 42 and 44. This construction and arrangement provides an optimum lever advantage over the range of the cutting width, such as up to at least 20 inches. Accordingly, this construction and arrangement also minimizes loads on the mounting bearings, pin assembly and minimizes structural shear arm stresses. In addition, this construction and arrangement simplifies mounting since no additional linkages are required. Further, since both shear arms are pivoted on a single pivot axis, the cutting radius is maintained. This allows cutting at angles for cutting leaning trees. Overall, this construction and arrangement provides ample space for the main clamp members so as to maintain the low profile for the apparatus.

As to the main clamp members, it will be seen that there is provided a pair of oppositely disposed clamp members 110 and 112 which are pivotally mounted, as at 114 and 116, to the frame structure 52 for picking up felled trees as known in the art. Here again, these main clamp members are pivotally movable toward and away from one another by another power actuator 118 which is pivotally connected at its opposite ends, as at 120 and 122, to the respective clamp members 110 and 112. The power actuator is generally of the same hydraulic type as that utilized for the shear arms 30 and 32 but is disposed (FIG. 3) so as to extend generally parallel to the power actuator 100 and slightly laterally forward of the same, as best illustrated in FIG. 2. As shown, the clamp members 110 and 112 are disposed vertically above (FIG. 2) the shear arms 30 and 32 with the actuator 118 thereof being disposed axially (relative to the pivot axis X) forwardly of the actuator 100, as aforesaid. Also, the pivot connections, as at 114 and 116, for the clamp members 110 and 112 are disposed directly in front of the pivot assembly 50, as best seen in FIG. 4. By this arrangement, there is provided a low profile construction adaptable for use with various tree harvester configurations. In addition, this arrangement enhances the self-alignment capability of the feller head assembly. In general, the clamp members are of a self-aligning nature, which provides maximum holding capacity when the tree or trees are not centrally oriented in respect to the feller head 22. The shear arms 30 and 32 are also of a self-aligned nature which enables cutting of trees in angular or off-set position. This feature is especially advantageous as it eliminates the need for special tilting mechanisms or the need for the boom section 24 to tilt about a horizontal axis.

In the invention, the felling head 22 is advantageously provided with a first shield plate member 130 which is integrally attached as at 132 (FIG. 2) to the support frame structure 52 and extends vertically downwardly in a direction toward the cutter blade elements 80 and 82. The shield 130 is of a generally spade-shaped configuration in front elevation view (FIG. 3), and is disposed forwardly of the power actuators 100 and 118 to provide a protective cover therefor against damage upon engagement with tree trunks or the like. At its upward connecting juncture 132 with the support frame, there is provided a generally V-shaped abutment plate which acts to provide a stop and shield for the tree trunks. In top plan view (FIG. 4), the shield 130 is of a generally Y-shape configuration with the construction and arrangement of the shield being such as to strengthen and rigidify the component parts. This also acts to absorb the shock forces upon engagement of the feller head with a tree trunk. The feller head may be provided with another protective shield 136 which acts as a protective top cover over and around the pivot pin assembly 50. As shown, this shield is of a generally right angle configuration (FIG. 2) so as to extend over the pin assembly and down over the back thereof. Also, the shield member, as desired, can be utilized to press against the butt end of the tree trunk to initiate movement of the tree trunk back into the bunk 16 of the articulated vehicle 2.

Having described one specific preferred embodiment of the invention, the following is claimed:

1. A tree harvesting apparatus of the type including a tree feller assembly, said assembly comprising:
    a feller head having a support structure;
    a pivot pin mounted horizontally on said support structure adjacent the top of said support structure and extending from the rear of said support structure and terminating centrally of said support structure,
    a pair of oppositely disposed and laterally spaced shear arm means mounted for pivotable movement about said pivot pin,
    each of said arm means extending from said pivot pin downwardly and forwardly of said support structure and terminating in a forward portion in front of said support structure,
    cutter blade means mounted on each arm on said forward portion of each arm, and
    power actuator means operably connected to said arm means and extending laterally therebetween and substantially forward of and below said pivot pin for pivoting said arms and cutter blade means toward and away from each other upon actuation thereof.

2. A tree harvesting apparatus in accordance with claim 1, wherein:
    said shear arm means includes a pair of oppositely disposed, and laterally spaced tubular members;
    angularly upwardly and inwardly disposed link members pivotally connecting said tubular members to said pivot pin, and
    shear arm members being integrally attached to the forwardmost ends of said tubular members for mounting said cutter blade means.

3. A tree harvesting apparatus in accordance with claim 2, wherein:
    said tubular members extend outwardly from said support structure and transversely of said power actuating means, and
    said power actuator means being disposed between said shear arm members and said link members.

4. A tree harvesting apparatus in accordance with claim 2, wherein:
    said power actuator means is disposed transversely below said common pivot means and said tubular members and above said cutter blade means.

5. A tree harvesting apparatus in accordance with claim 2, including: pivot pin means mounted vertically on said support means in front of said horizontally mounted pivot pin,
    a pair of oppositely disposed and laterally spaced clamp members mounted for pivotal movement toward and away from one another on said pivot pin means and above said shear arm means, and
    another power actuator means extending horizontally between said clamp members for pivoting said clamp members toward and away from one another upon actuation thereof.

6. A tree harvesting apparatus in accordance with claim 5, wherein:
    said other power actuator means extends parallel to said first mentioned power actuator means and transversely of said pivot pin.

7. A tree harvesting apparatus in accordance with claim 5, wherein:
    said clamp members are disposed directly forwardly of said pivot pin and above said first mentioned power actuator means.

8. A tree harvesting apparatus in accordance with claim 1, wherein:
    a wear plate means is mounted on said support structure and extends horizontally between said shear arm means to provide a guide and self-align action for said cutter blade elements.

9. A tree harvesting apparatus in accordance with claim 1, wherein:
    said support arm members being of a generally L-shaped configuration, and tubular portions extending generally parallel to one another, and generally parallel to said pivot pin.

10. A tree harvesting apparatus in accordance with claim 1, wherein:
    said wear plate means is of an arcuate construction having a curvature corresponding substantially to the cutting radius defined by said cutter blade means, and said wear plate means being disposed forwardly of said power actuator means.

11. A tree harvesting apparatus in accordance with claim 10, wherein:
    said cutter blade means are disposed forwardly of said wear plate and are disposed for sliding coacting enagagement on said wear plate means thereby to guide said cutter blade means upon movement toward and away from one another upon actuation of said power actuator means.

* * * * *